United States Patent
Fu et al.

(10) Patent No.: US 11,647,434 B2
(45) Date of Patent: May 9, 2023

(54) METHOD AND DEVICE FOR DETERMINING RRM MEASUREMENT CONFIGURATION

(71) Applicant: DATANG MOBILE COMMUNICATIONS EQUIPMENT CO.,LTD, Beijing (CN)

(72) Inventors: Jing Fu, Beijing (CN); Jing Liang, Beijing (CN); Aijuan Liu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 262 days.

(21) Appl. No.: 17/054,181

(22) PCT Filed: Mar. 26, 2019

(86) PCT No.: PCT/CN2019/079750
§ 371 (c)(1),
(2) Date: Nov. 10, 2020

(87) PCT Pub. No.: WO2019/214355
PCT Pub. Date: Nov. 14, 2019

(65) Prior Publication Data
US 2021/0168677 A1    Jun. 3, 2021

(30) Foreign Application Priority Data
May 11, 2018   (CN) .......................... 201810451257.7

(51) Int. Cl.
*H04W 36/00*      (2009.01)

(52) U.S. Cl.
CPC ... *H04W 36/0085* (2018.08); *H04W 36/0058* (2018.08); *H04W 36/00835* (2018.08)

(58) Field of Classification Search
CPC ..................... H04W 36/0085; H04W 36/0058
See application file for complete search history.

(56) References Cited

U.S. PATENT DOCUMENTS

2018/0323850 A1* 11/2018 Baligh .................. H04W 48/12
2020/0404518 A1* 12/2020 Yuan ..................... H04W 24/02

FOREIGN PATENT DOCUMENTS

| CN | 103220703 A | 7/2013 |
| CN | 106211261 A | 12/2016 |

(Continued)

OTHER PUBLICATIONS

Vivo, "On measurement event of EN-DC",3GPP TSG-RAN WG2 NR Ad Hoc, Qingdao, China, Jun. 27-29, 2017, total 5 pages, R2-1706963.

(Continued)

*Primary Examiner* — Zhiren Qin
(74) *Attorney, Agent, or Firm* — Kilpatrick Townsend & Stockton, LLP

(57) ABSTRACT

The present application can provide a method and device for determining an RRM measurement configuration. The method includes a first node receiving resource information sent by a second node and used by at least one RRM measurement corresponding to a neighbor node of the second node; and determining an RRM measurement configuration required for a UE to perform an RRM measurement according to the resource information used by the at least one RRM measurement.

27 Claims, 5 Drawing Sheets

(56) References Cited

FOREIGN PATENT DOCUMENTS

| CN | 107624253 A | 1/2018 |
|---|---|---|
| WO | 2017035797 A1 | 3/2017 |
| WO | 2017054477 A1 | 4/2017 |

OTHER PUBLICATIONS

Huawei et al., "Measurement configuration and procedures for CSI-RS", 3GPP TSG-RAN WG2 #99bis, Prague, Czech Republic, Oct. 9-13, 2017, total 5 pages, R2-1711815.

ZTE Corporation et al.,"Discussion on the Stage 2 Architecture of NN-DC",3GPP TSG RAN WG2 Meeting #101, Athens, Greece, Feb. 26-Mar. 2, 2018, total 14 pages, R2-1802398.

Samsung,"RRM measurement for multiple numerologies", 3GPP TSG-RAN WG2 NR #101b Meeting, Sanya, China, Apr. 16-20, 2018, total 5 pages, R2-1805850(Update of R2-1802467).

Samsung et al., "RRM function split between gNB-CU and gNB-DU", 3GPP TSG-RAN WG3 Meeting Ad Hoc, Qingdao, P. R. China, Jun. 27-29, 2017, total 3 pages, R3-172254.

3GPP TS 36.300 V15.1.0, 3rd Generation Partnership Project: Technical Specification Group Radio Access Network; Evolved Universal Terrestrial Radio Access (E-UTRA) and Evolved Universal Terrestrial Radio Access Network (E-UTRAN);Overall description; Stage 2, Release 15, total 341 pages, Mar. 2018.

3GPP TS 38.300 V15.1.0, 3rd Generation Partnership Project;Technical Specification Group Radio Access Network; NR; NR and NG-RAN Overall Description;Stage 2, Release 15, total 71 pages,Mar. 2018.

AT&T,"Inter-DU Mobility with Limited RRC Involvement", 3GPP TSG-RAN WG2 Meeting #98, Hangzhou, P.R. China, May 15-19, 2017, total 5 pages, R2-1704488.

Ericsson,"Measurement capability/gap coordination", 3GPP TSG-RAN WG2#NR AH1801 .Vancouver, Canada, Jan. 22-25, 2018, total 3 pages, R2-1801011.

CMCC,"Discussion on Intra-DU Inter-Cell Mobility", 3GPP TSG-RAN WG3#97, Berlin, Germany, Aug. 21-25, 2017, total 8 pages, R3-173142.

3GPP TS 37.340 V1 5.1.0,3rd Generation Partnership Project; Technical Specification Group Radio Access Network; Evolved Universal Terrestrial Radio Access (E-UTRA) and NR;Multi-connectivity;Stage 2 (Release 15), Mar. 2018, total 52 pages.

\* cited by examiner

METHOD AND DEVICE FOR DETERMINING RRM MEASUREMENT CONFIGURATION

The present application is a national phase entry under 35 U.S.C. § 371 of International Application No. PCT/CN2019/079750, filed on Mar. 26, 2019, which claims the priority from Chinese Patent Application No. 201810451257.7, filed with the China National Intellectual Property Administration (CNIPA) on May 11, 2018 and entitled "Method and Device for Determining RRM Measurement Configuration", the entire content of which is incorporated herein by reference.

FIELD

The present application relates to the field of wireless communication technologies, and particularly to a method and device for determining RRM measurement configuration.

BACKGROUND

In the newly designed New Radio Access (NR) system in the future, the utilization and operation of high-frequency wireless carrier resources will play an increasingly important role. By means of carrier aggregation and tightly coupled multi-connection and other ways, a wider range of high-frequency carrier resources can be fully aggregated and utilized to improve the capacity and throughput performance of the NR system.

In the future NR system, the Radio Resource Management (RRM) measurement may be based on two types of pilot signals, which are Synchronization Signal Block (SSB) and Channel State Information-Reference Signal (CSI-RS) respectively. When a User Equipment (UE) performs the RRM measurement, it needs to measure and report the neighbor cell signals. Then, when performing the RRM measurement configuration for the UE, a Radio Access Network (RAN) side node needs to notify the UE of the resource information used by a neighbor node to perform the corresponding RRM measurement. However, in the future NR system, the RAN side node cannot know the resource information used by the neighbor node to perform the corresponding RRM measurement, and thus cannot perform the proper RRM measurement configuration for the UE.

In summary, the RAN side node cannot perform the proper RRM measurement configuration for the UE in the future NR system.

SUMMARY

The present application provides a method and device for determining RRM measurement configuration, to solve the problem in the prior art that the RAN side node cannot allocate the proper RRM measurement configuration for the UE in the future NR system.

Based on the above problem, in a first aspect, an embodiment of the present application provides a method for determining RRM measurement configuration, including:
receiving, by a first node, resource information sent by a second node and used by at least one RRM measurement corresponding to a neighbor node of the second node; and
determining, by the first node, RRM measurement configuration required for a UE to perform an RRM measurement according to the resource information used by the at least one RRM measurement.

In one embodiment, the resource information used by the at least one RRM measurement corresponding to the neighbor node is:
resource information of an RRM measurement corresponding to a cell covered by the neighbor node; or
resource information of an RRM measurement corresponding to a frequency point of a cell covered by the neighbor node.

In one embodiment, the resource information used by the RRM measurement includes: resource information corresponding to an SSB and/or resource information corresponding to a CSI-RS.

In one embodiment, the resource information is a time-domain position and/or a frequency-domain position.

In one embodiment, the first node is an RAN side node of a NR system, and the second node is an RAN side node of an LTE system; or the first node is an RAN side node of the LTE system, and the second node is an RAN side node of the NR system.

In one embodiment, the receiving, by the first node, the resource information sent by the second node and used by the at least one RRM measurement corresponding to the neighbor node of the second node, includes: receiving, by the first node, the resource information carried in a first message sent by the second node and used by the at least one RRM measurement corresponding to the neighbor node of the second node.

In one embodiment, the first message is one of: an interface setup request message, a first interface setup response message, a secondary node addition request message, a secondary node modification request message, a secondary node modification requirement message.

In one embodiment, the method further includes: receiving, by the first node, a first update message sent by the second node;
where the first update message is sent after the second node determines that the resource information used by an RRM measurement corresponding to the neighbor node has changed, and
the first update message includes changed resource information used by the RRM measurement corresponding to the neighbor node, or
the first update message includes resource information used by all RRM measurements corresponding to the neighbor node; or
where the first update message is sent after the second node determines that one neighbor node of the second node has changed, and
the first update message includes resource information used by an RRM measurement corresponding to a changed neighbor node, or
the first update message includes resource information used by RRM measurements corresponding to all neighbor nodes.

In one embodiment, the first update message is a first configuration update message or a secondary node modification requirement message.

In one embodiment, when the first node is the RAN side node of the NR system and the second node is the RAN side node of the LTE system, the determining, by the first node, the RRM measurement configuration required for the UE to perform the RRM measurement according to the resource information used by the at least one RRM measurement, includes:
determining, by the first node, a measurement object that the UE needs to measure according to the resource information used by the at least one RRM measurement; and/or determining, by the first node, resource information used by an RRM measurement corresponding to a frequency point configured for the UE from the resource information used by the at least one RRM measurement; and determining a measurement gap according to the resource information used by the RRM measurement corresponding to the frequency point configured for the UE.

In one embodiment, the frequency point configured for the UE is an FR2 frequency point.

In one embodiment, when the first node is the RAN side node of the LTE system and the second node is the RAN side node of the NR system, the determining, by the first node, the RRM measurement configuration required for the UE to perform the RRM measurement according to the resource information used by the at least one RRM measurement, includes:

determining, by the first node, resource information used by an RRM measurement corresponding to a frequency point configured for the UE from the resource information used by the at least one RRM measurement; and determining a measurement gap according to the resource information used by the RRM measurement corresponding to the frequency point configured for the UE.

In one embodiment, the first node is a DU node of an NR system, and the second node is a CU node of the NR system.

In one embodiment, the receiving, by the first node, the resource information sent by the second node and used by the at least one RRM measurement corresponding to the neighbor node of the second node, includes:

receiving, by the first node, resource information carried in a second message sent by the second node and used by the at least one RRM measurement corresponding to the neighbor node of the second node.

In one embodiment, the second message is one of: a second interface setup response message, a UE context setup request message, a UE context modification request message.

In one embodiment, the method further includes: receiving, by the first node, a second update message sent by the second node;

where the second update message is sent after the second node determines that the resource information used by an RRM measurement corresponding to the neighbor node has changed, and the second update message includes changed resource information used by the RRM measurement corresponding to the neighbor node, or the second update message includes resource information used by all RRM measurements corresponding to the neighbor node; or where the second update message is sent after the second node determines that one neighbor node of the second node has changed, and the second update message includes resource information used by an RRM measurement corresponding to a changed neighbor node, or the second update message includes resource information used by RRM measurements corresponding to all neighbor nodes.

In one embodiment, the second update message is a second configuration update message or a UE context modification request message.

In one embodiment, the determining, by the first node, the RRM measurement configuration required for the UE to perform the RRM measurement according to the resource information used by the at least one RRM measurement, includes:

determining, by the first node, resource information used by an RRM measurement corresponding to a frequency point configured for the UE from the resource information used by the at least one RRM measurement; and determining a measurement gap according to the resource information used by the RRM measurement corresponding to the frequency point configured for the UE.

In one embodiment, the frequency point configured for the UE is an NR frequency point.

In a second aspect, an embodiment of the present application provides a first kind of first node for determining RRM measurement configuration, including a processor, a memory and a transceiver; where the processor is configured to read a program in the memory and perform the process of:

receiving resource information sent by a second node and used by at least one RRM measurement corresponding to a neighbor node of the second node; and determining RRM measurement configuration required for a UE to perform an RRM measurement according to the resource information used by the at least one RRM measurement.

In one embodiment, the resource information used by the at least one RRM measurement corresponding to the neighbor node is:

resource information of an RRM measurement corresponding to a cell covered by the neighbor node; or resource information of an RRM measurement corresponding to a frequency point of a cell covered by the neighbor node.

In one embodiment, the resource information used by the at least one RRM measurement includes: resource information corresponding to an SSB and/or resource information corresponding to a CSI-RS.

In one embodiment, the resource information is a time-domain position and/or a frequency-domain position.

In one embodiment, the first node is an RAN side node of a NR system, and the second node is an RAN side node of an LTE system; or the first node is an RAN side node of the LTE system, and the second node is an RAN side node of the NR system.

In one embodiment, the processor is configured to: receive resource information carried in a first message sent by the second node and used by the at least one RRM measurement corresponding to the neighbor node of the second node.

In one embodiment, the first message is one of: an interface setup request message, a first interface setup response message, a secondary node addition request message, a secondary node modification request message, a secondary node modification requirement message.

In one embodiment, the processor is further configured to: receive a first update message sent by the second node;

where the first update message is sent after the second node determines that the resource information used by an RRM measurement corresponding to the neighbor node has changed, and the first update message includes changed resource information used by the RRM measurement corresponding to the neighbor node, or the first update message includes resource information used by all RRM measurements corresponding to the neighbor node; or where the first update message is sent after the second node determines one neighbor node of the second node has changed, and the first update message includes resource information used by an RRM measurement corresponding to a changed neighbor node, or the first update message includes resource information used by RRM measurements corresponding to all neighbor nodes.

In one embodiment, the first update message is a first configuration update message or a secondary node modification requirement message.

In one embodiment, when the first node is the RAN side node of the NR system and the second node is the RAN side node of the LTE system, the processor is configured to:

determine a measurement object that the UE needs to measure according to the resource information used by the at least one RRM measurement; and/or determine resource information used by an RRM measurement corresponding to a frequency point configured for the UE from the resource information used by the at least one RRM measurement; and determine a measurement gap according to the resource information used by the RRM measurement corresponding to the frequency point configured for the UE.

In one embodiment, when the first node is the RAN side node of the LTE system and the second node is the RAN side node of the NR system, the processor is configured to:

determine resource information used by an RRM measurement corresponding to a frequency point configured for the UE from the resource information used by the at least one RRM measurement; and determine a measurement gap according to the resource information used by the RRM measurement corresponding to the frequency point configured for the UE.

In one embodiment, the first node is a DU node of an NR system, and the second node is a CU node of the NR system.

In one embodiment, the processor is configured to: receive resource information carried in a second message sent by the second node and used by the at least one RRM measurement corresponding to the neighbor node of the second node.

In one embodiment, the second message is one of: a second interface setup response message, a UE context setup request message, a UE context modification request message.

In one embodiment, the processor is further configured to: receive a second update message sent by the second node;

where the second update message is sent after the second node determines that the resource information used by an RRM measurement corresponding to the neighbor node has changed, and the second update message includes changed resource information used by the RRM measurement corresponding to the neighbor node, or the second update message includes resource information used by all RRM measurements corresponding to the neighbor node; or where the second update message is sent after the second node determines that one neighbor node of the second node has changed, and the second update message includes resource information used by an RRM measurement corresponding to a changed neighbor node, or the second update message includes resource information used by RRM measurements corresponding to all neighbor nodes.

In one embodiment, the second update message is a second configuration update message or a UE context modification request message.

In one embodiment, the processor is configured to: determine resource information used by an RRM measurement corresponding to a frequency point configured for the UE from the resource information used by the at least one RRM measurement; and determine a measurement gap according to the resource information used by the RRM measurement corresponding to the frequency point configured for the UE.

In a third aspect, an embodiment of the present application provides a second kind of first node for determining RRM measurement configuration, including:

a receiving device configured to receive resource information sent by a second node and used by at least one RRM measurement corresponding to a neighbor node of the second node;

a determining device configured to determine RRM measurement configuration required for a UE to perform an RRM measurement according to the resource information used by the at least one RRM measurement.

In a fourth aspect, an embodiment of the present application provides a computer storage medium storing a computer program thereon, where the program, when executed by a processor, implements the steps in the first aspect described above.

DETAILED DESCRIPTION OF THE EMBODIMENTS

Figure 1A:
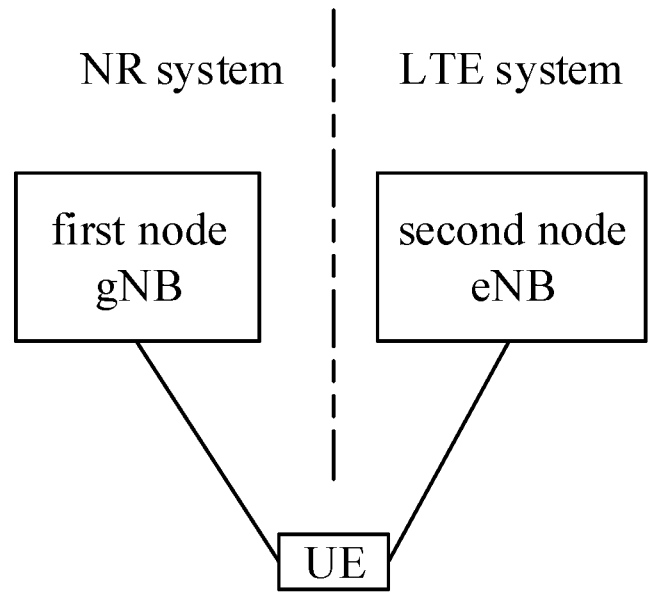
FIG. 1A is a structural schematic diagram of an EN-DC network structure according to an embodiment of the present application.

In the embodiments of the present application, a first node receives the resource information sent by a second node and used by at least one RRM measurement corresponding to a neighbor node of the second node; and the first node determines the RRM measurement configuration required for a UE to perform the RRM measurement according to the resource information used by the at least one RRM measurement.

In the embodiments of the present application, the first node receives the resource information sent by the second node and used by the RRM measurement corresponding to the neighbor node, so that the first node can know the resource information used by the RRM measurement corresponding to the neighbor node of the second node. The first node can determine the RRM measurement configuration required by the UE to perform the RRM measurement according to the resource information used by the RRM measurement corresponding to the neighbor node of the second node, and notify the UE of the determined RRM measurement configuration, so that the UE performs the RRM measurement according to the RRM measurement configuration configured by the first node, to further improve the system performance.

It should be noted that the nouns "network" and "system" are often used alternately in the embodiments of the present application.

The term "a plurality of" in the embodiments of the present application refers to two or more, and other quantifiers are similar thereto.

In the description of the embodiments of the present application, the word such as "first" or "second" is only for purpose of distinguishing the description, and cannot be construed to indicate or imply the relative importance and cannot be construed to indicate or imply the order either. In the description of the embodiments of the present application, "a plurality of" refers to two or more.

The term "and/or" in the embodiments of the present application is simply an association relationship describing the associated objects, indicating that there may be three relationships, for example, A and/or B may represent: only A, both A and B, and only B. Furthermore, the character "/" herein generally indicates that the associated objects have a kind of "or" relationship.

The embodiments of the present application can be applicable to the NR system, and can also be applicable to other wireless communication systems, e.g., Long Term Evolution (LTE) system, Global System for Mobile Communication (GSM), Universal Mobile Telecommunications System (UMTS), Code Division Multiple Access (CDMA) system, new network device systems and the like.

The UE involved in the embodiments of the present application can refer to the device for providing the voice and/or data connectivity to the user, the handheld device with the wireless connection function, or other processing device connected to the wireless modem. The wireless user equipment can communicate with one or more core networks via the RAN, and the wireless user equipment can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless user equipment can also be called system, Subscriber Unit, Subscriber Station, Mobile Station, Mobile, Remote Station, Access Point, Remote Terminal, Access Terminal, User Terminal, User Agent, or User Device.

The method for determining the RRM measurement configuration of the embodiments of the present application is suitable for 5G scenarios. In one embodiment, the scenario may be EN-DC (E: Evolved Universal Terrestrial Radio Access (E-UTRA); N: New Radio Access (NR); DC: Dual Connectivity) scenario; or CU-DU (CU: Central Unit; DU: Distributed Unit) scenario.

In the EN-DC scenario, the first node and the second node are RAN side nodes of different systems; and In one embodiment, the first node is an RAN side node of the NR system, and the second node is an RAN side node of the LTE system.

In the EN-DC network structure shown in FIG. 1A, taking the first node gNB as the RAN side node of the NR system and the second node eNB as the RAN side node of the LTE system as an example, the UE can be dual-connected with the gNB and eNB.

In the EN-DC scenario as shown in FIG. 1A, since the first node configures the RRM measurement configuration for the UE, and the first node and the second node are RAN side nodes of different systems, the first node cannot know the resource information used for the RRM measurement corresponding to a neighbor node of the second node in the current method.

In the CU-DU scenario, the first node is a DU node, and the second node is a CU node.

Figure 1B:
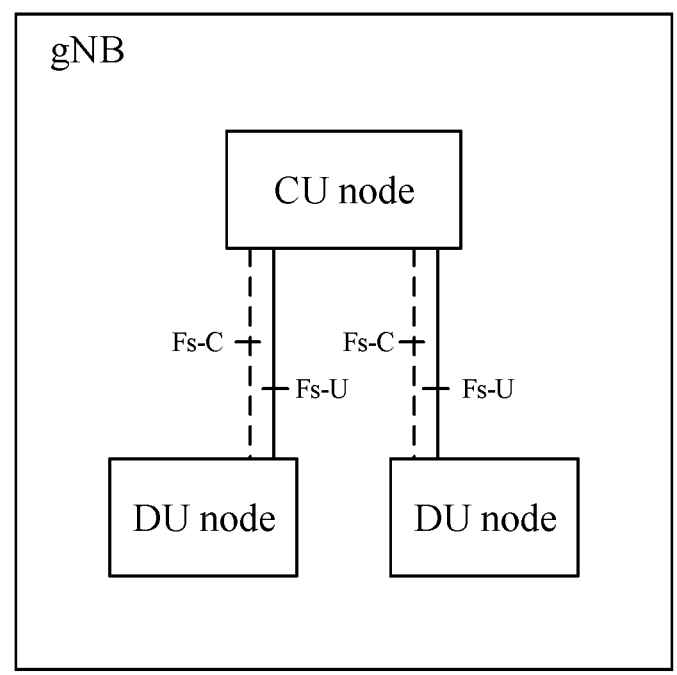
FIG. 1B is a structural schematic diagram of a CU-DU network structure according to an embodiment of the present application.

In the CU-DU architecture shown in FIG. 1B, the gNB contains CU and DU nodes, as shown, the CU node contains the main functions of the gNB, such as mobility management and UE Radio Resource Control (RRC), etc., and the DU node contains the sub-functions of the gNB, and its operation is controlled by the CU node.

In the CU-DU scenario as shown in FIG. 1B, since the DU node configures the RRM measurement configuration for the UE, the DU node cannot know the resource information used for the RRM measurement corresponding to the neighbor node of the CU node in the current method.

In an implementation, a UE may perform the RRM measurement based on the SSB or CSI-RS pilot signals; and the resource information used for the RRM measurement includes: resource information corresponding to SSB and/or resource information corresponding to CSI-RS.

In one embodiment, the resource information is a time-domain position and/or a frequency-domain position.

The resource information used for the RRM measurement may be:
a time-domain position corresponding to SSB; or
a frequency-domain position corresponding to SSB; or
a time-domain position and a frequency-domain position corresponding to SSB; or
a time-domain position corresponding to CSI-RS; or
a frequency-domain position corresponding to CSI-RS; or
a time-domain position and a frequency-domain position corresponding to CSI-RS; or
a time-domain position corresponding to SSB, and a time-domain position corresponding to CSI-RS; or
a time-domain position corresponding to SSB, and a frequency-domain position corresponding to CSI-RS; or
a time-domain position corresponding to SSB, and a time-domain position and a frequency-domain position corresponding to CSI-RS; or
a frequency-domain position corresponding to SSB, and a time-domain position corresponding to CSI-RS; or
a frequency-domain position corresponding to SSB, and a frequency-domain position corresponding to CSI-RS; or
a frequency-domain position corresponding to SSB, and a time-domain position and a frequency-domain position corresponding to CSI-RS; or
a time-domain position and a frequency-domain position corresponding to SSB, and a time-domain position corresponding to CSI-RS; or
a time-domain position and a frequency-domain position corresponding to SSB, and a frequency-domain position corresponding to CSI-RS; or a time-domain position and a frequency-domain position corresponding to SSB, and a time-domain position and a frequency-domain position corresponding to CSI-RS.

In the illustration process, the implementations of the first node and the second node will be illustrated respectively, and then the instance implemented by both of them in cooperation is also given to better understand the implementations of the solution provided in the embodiments of the present application. Such illustration does not mean they must implement in cooperation or must implement alone. Actually, when the first node and the second node implement separately, they also solve the problems at the first node side and the second node side respectively, but when they are used in combination, the better effect may be obtained.

Figure 2:
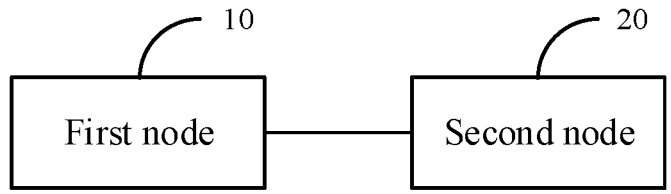
FIG. 2 is a structural schematic diagram of a system for determining the RRM measurement configuration according to an embodiment of the present application.

As shown in FIG. 2, a system for determining the RRM measurement configuration in an embodiment of the present application includes:

a first node 10 configured to receive the resource information sent by a second node and used by at least one RRM measurement corresponding to one or more neighbor node of the second node; and determine the RRM measurement configuration required for a UE to perform the RRM measurement according to the resource information used by the at least one RRM measurement;

a second node 20 configured to obtain the resource information used by at least one RRM measurement corresponding to the neighbor node of the second node, and send the obtained resource information used by at least one RRM measurement corresponding to the neighbor node to the first node.

In one embodiment, the resource information used by the at least one RRM measurement corresponding to the neighbor node of the second node is: the resource information used by the RRM measurement corresponding to cell(s) covered by the neighbor node; or the resource information used by the RRM measurement corresponding to frequency point(s) of a cell covered by the neighbor node.

In an implementation, when the second node sends the resource information used by at least one RRM measurement corresponding to the neighbor node of the second node to the first node, the neighbor cell of the second node may be used as the granularity for sending, or the frequency point of the neighbor cell of the second node may be used as the granularity for sending.

1. When the resource information used by at least one RRM measurement corresponding to the neighbor node of the second node is the resource information used by the RRM measurement corresponding to a cell covered by the neighbor node of the second node, the second node sends the resource information used by the RRM measurement corresponding to the cell covered by its neighbor node to the first node.

In one embodiment, the second node sends the correspondence between cell identities of cells covered by its neighbor node and resource information used by RRM measurements to the first node. For example, the cells covered by the neighbor node of the second node include cell 1, cell 2, cell 3, cell 4 and cell 5; and the resource information used by the RRM measurement corresponding to the cell 1 is A, the resource information used by the RRM measurement corresponding to the cell 2 is B, the resource information used by the RRM measurement corresponding to the cell 3 is C, the resource information used by the RRM measurement corresponding to the cell 4 is A, and the resource information used by the RRM measurement corresponding to the cell 5 is C; and then the second node sends the resource information A corresponding to the cell 1, the resource information B corresponding to the cell 2, the resource information C corresponding to the cell 3, the resource information A corresponding to the cell 4, and the resource information C corresponding to the cell 5 to the first node.

2. When the resource information used by at least one RRM measurement corresponding to the neighbor node of the second node is the resource information used by the RRM measurement corresponding to a frequency point of a cell covered by the neighbor node of the second node, the second node sends the resource information used by the RRM measurement corresponding to the frequency point of the cell covered by the neighbor node to the first node.

In one embodiment, the second node sends the correspondence between frequency points of cells covered by its neighbor node and resource information used by RRM measurements to the first node. For example, the cells covered by the neighbor node of the second node include cell 1, cell 2, cell 3, cell 4 and cell 5; the frequency point of the cell 1 is a, the frequency point of the cell 2 is b, the frequency point of the cell 3 is c, the frequency point of the cell 4 is a, and the frequency point of the cell 5 is c; the resource information used by the RRM measurement corresponding to the frequency point a is A, the resource information used by the RRM measurement corresponding to the frequency point b is B, and the resource information used by the RRM measurement corresponding to the frequency point c is C; and then the second node sends the resource information A corresponding to the frequency point a, the resource information B corresponding to the frequency point b and the resource information C corresponding to the frequency point c to the first node.

In an embodiment of the present application, the first node and the second node are RAN side nodes of different systems. In one embodiment, the first node is an RAN side node of the NR system, and the second node is an RAN side node of the LTE system; or the first node is an RAN side node of the LTE system, and the second node is an RAN side node of the NR system.

In one embodiment, the first node and the second node are RAN side nodes of a same system. In another embodiment, the first node and the second node are both RAN side nodes of the NR system, where the first node is a DU node of the NR system, and the second node is a CU node of the NR system.

The two cases will be explained below respectively.

Case 1: the first node and the second node are RAN side nodes of different systems.

In an embodiment of the present application, the first node configures the RRM measurement configuration for the UE; where the first node may be an RAN side node gNB of the NR system, or the first node may be an RAN side node eNB of the LTE system.

1. The RAN side node gNB of the NR system configures the RRM measurement configuration for the UE.

The first node is the RAN side node gNB of the NR system, and the second node is the RAN side node eNB of the LTE system; and the X2 connection is established between the gNB and the eNB.

The eNB obtains the resource information used by the RRM measurement corresponding to a cell covered by its neighbor node, or the eNB obtains the resource information used by the RRM measurement corresponding to a frequency point of the cell covered by its neighbor node, and the eNB sends the obtained resource information used by the RRM measurement to the gNB.

In one embodiment, the eNB sends a first message to the gNB, where the first message carries the resource information used by at least one RRM measurement corresponding to a neighbor node of the eNB.

Correspondingly, the gNB receives the resource information carried in the first message sent by the eNB and used by at least one RRM measurement corresponding to the neighbor node of the eNB.

The first message is one of: an interface setup request message, a first interface setup response message, a secondary node addition request message, a secondary node modification request message, a secondary node modification requirement message.

Here, the interface setup request message is for requesting the interface setup. For example, the interface setup request message is an EN-DC X2 SETUP REQUEST message or an NE-DC X2 SETUP REQUEST message.

The first interface setup response message is for responding to the interface setup. For example, the first interface setup response message is an EN-DC X2 SETUP RESPONSE message or an NE-DC X2 SETUP RESPONSE message.

The secondary node addition request message is for requesting to add a secondary node. For example, the secondary node addition request message is an SENB ADDITION REQUEST message.

The secondary node modification request message is for requesting the secondary node to modify the related information. For example, the secondary node modification request message is an SENB MODIFICATION REQUEST message.

The secondary node modification requirement message is for the secondary node to actively request to modify the related information. For example, the secondary node modification requirement message is an SENB MODIFICATION REQUIRED message.

In an embodiment of the application, the eNB sends a first update message to the gNB when it determines that the following scenarios have occurred.

Scenario 1: the eNB determines that the resource information used by the RRM measurement corresponding to the neighbor node has changed.

The neighbor node of the eNB corresponds to the resource information used by at least one RRM measurement. As long as the resource information used by the RRM measurement corresponding to the neighbor node has changed, the eNB determines that the resource information used by the RRM measurement corresponding to the neighbor node has changed.

In one embodiment, the eNB determines that the resource information used by the RRM measurement corresponding to a cell covered by the neighbor node has changed, or the eNB determines that the resource information used by the RRM measurement corresponding to a frequency point of the cell covered by the neighbor node has changed.

Here, the change includes but not limited to: the increase in cells covered by the neighbor node, the decrease in cells covered by the neighbor node, and the change in the resource information used by the RRM measurement corresponding to the cell covered by the neighbor node.

For example, the neighbor nodes of the eNB include node A, node B and node C; the cells covered by the node A include cell 1, cell 2 and cell 3; the cells covered by the node B include cell 4 and cell 5; and the cells covered by the node C include cell 6, cell 7 and cell 8. When the resource information used by the RRM measurement corresponding to the cell 2 covered by the node A changes, the eNB sends a first update message to the gNB; or when a cell 9 is added to the cells covered by the node B, the eNB sends a first update message to the gNB; or after the cells covered by the node C do not include the cell 6, the eNB sends a first update message to the gNB.

The first update message sent by the eNB to the gNB contains the changed resource information used by the RRM measurement corresponding to the neighbor node, or the first update message contains the resource information used by all the RRM measurement(s) corresponding to the neighbor node after the change.

It should be noted that, when the first update message contains the resource information used by all the RRM measurements corresponding to the neighbor node after the change, the first update message contains both the changed resource information used by the RRM measurement and the unchanged resource information used by the RRM measurement.

For example, the neighbor nodes of the eNB include node A and node B; the cells covered by the node B include cell 1, cell 2 and cell 3, and the cells covered by the node A include cell 4 and cell 5; assuming that the resource information used by the RRM measurement corresponding to the cell 3 changes, the first update message sent by the eNB to the gNB only includes the changed resource information used by the RRM measurement corresponding to the cell 3, or the first update message sent by the eNB to the gNB includes both the changed resource information used by the RRM measurement corresponding to the cell 3 and the resource information used by the RRM measurements corresponding to the cell 1, cell 2, cell 4 and cell 5.

Scenario 2: the eNB determines that the neighbor nodes of the eNB have changed.

The changes in neighbor nodes of the eNB include but not limited to: the decrease in neighbor nodes, the increase in neighbor nodes.

In one embodiment, when determining that the neighbor nodes have changed, the eNB determines the resource information used by the RRM measurement corresponding to the changed neighbor node.

The first update message sent by the eNB to the gNB contains the resource information used by the RRM measurement corresponding to the changed neighbor node, or the first update message contains the resource information used by the RRM measurements corresponding to all the neighbor nodes after the change.

For example, the neighbor nodes of the eNB include node A and node B; the cells covered by the node A include cell 1, cell 2 and cell 3, and the cells covered by the node B include cell 4 and cell 5; assuming that the eNB detects that a node C is added as a neighbor node of the eNB, the first update message sent by the eNB to the gNB only includes the resource information used by the RRM measurement corresponding to the node C, or the first update message sent by the eNB to the gNB includes both the resource information used by the RRM measurement corresponding to the added node C and the resource information used by the RRM measurements corresponding to the nodes A and B. For another example, assuming the eNB detects a decrease in neighbor nodes, the eNB notifies the gNB which node has been deleted, and the first update message includes only deleted resource information used by the RRM measurement corresponding to the deleted node, or the first update message includes resource information used by the RRM measurements corresponding to all nodes except the deleted node. In some embodiments, the eNB has only one neighbor node, and assuming the eNB detects a decrease in the neighbor node, the field of the first update message may include the deleted neighbor node/the deleted info, or may be empty, in which case the first update message notifies the gNB that the eNB currently has no neighbor nodes.

Here, the first update message is a first configuration update message or a secondary node modification requirement message.

The first configuration update message is for informing the peer end that the relevant configuration has been updated. For example, the first configuration update message is an EN-DC CONFIGURATION UPDATE message or an NE-DC CONFIGURATION UPDATE message.

The secondary node modification requirement message is for the secondary node to actively request to modify the related information. For example, the secondary node modification requirement message is an SENB MODIFICATION REQUIRED message.

The first configuration update message may be an EN-DC CONFIGURATION UPDATE message; and the secondary node modification requirement message may be an SENB MODIFICATION REQUIRED message.

In an embodiment of the present application, after receiving the resource information used by the RRM measurement corresponding to the neighbor node sent by the eNB, the gNB determines the RRM measurement configuration required by the UE to perform the RRM measurement according to the received resource information used by the RRM measurement.

Here, the RRM measurement configuration required by the UE to perform the RRM measurement includes but not limited to: the measurement object that needs to be measured, and the measurement gap.

In an implementation, after receiving the resource information used by the RRM measurement corresponding to the neighbor node sent by the eNB, the gNB determines the RRM measurement configuration required by the UE to perform the RRM measurement according to some or all of the following ways.

In a first way, the gNB determines one or more measurement objects that the UE needs to measure according to the resource information used by the RRM measurement corresponding to the neighbor node sent by the eNB.

In a second way, the gNB determines the resource information used by the RRM measurement corresponding to one or more frequency points configured for the UE from the resource information used by the RRM measurement corresponding to the neighbor node sent by the eNB; and determines the measurement gap according to the resource information used by the RRM measurement corresponding to the frequency point configured for the UE.

Here, the frequency point configured for the UE is in one embodiment an FR2 frequency point.

Figure 3:
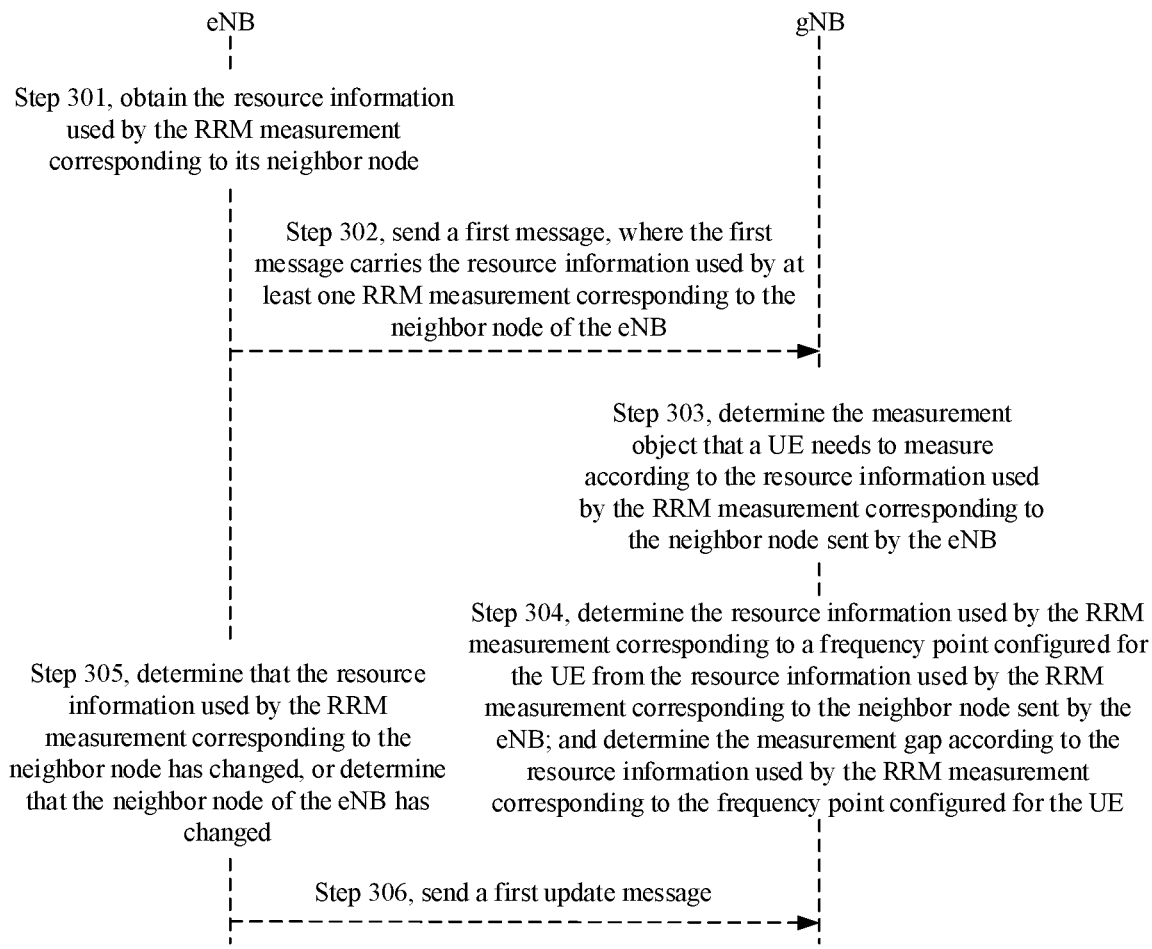
FIG. 3 is a first complete flowchart of determining the RRM measurement configuration according to an embodiment of the present application.

As shown in FIG. 3, an overall flowchart of a method for determining the RRM measurement configuration when the first node is a gNB and the second node is an eNB in an embodiment of the present application is shown.

Step 301, the eNB obtains the resource information used by the RRM measurement corresponding to its neighbor node.

Here, the resource information used by the RRM measurement corresponding to the neighbor node is the resource information used by the RRM measurement corresponding to a cell covered by the neighbor node, or the resource information used by the RRM measurement corresponding to a frequency point of a cell covered by the neighbor node.

Step 302, the eNB sends a first message to the gNB, where the first message carries the resource information used by at least one RRM measurement corresponding to the neighbor node of the eNB.

Step 303, the gNB determines the measurement object that a UE needs to measure according to the resource information used by the RRM measurement corresponding to the neighbor node sent by the eNB.

Step 304, the gNB determines the resource information used by the RRM measurement corresponding to a frequency point configured for the UE from the resource information used by the RRM measurement corresponding to the neighbor node sent by the eNB; and determines the measurement gap according to the resource information used by the RRM measurement corresponding to the frequency point configured for the UE.

It should be noted that, in an implementation, it is possible, according to actual conditions, to perform only step 303, or only step 304, or both steps 303 and 304 where the execution order of steps 303 and 304 is not limited.

Step 305, the eNB determines that the resource information used by the RRM measurement corresponding to the neighbor node has changed, or determines that the neighbor node of the eNB has changed.

Step 306, the eNB sends a first update message to the gNB.

Here, the first update message contains the changed resource information used by the RRM measurement corresponding to the neighbor node, or the resource information used by all the RRM measurements corresponding to the neighbor node after the change; or the first update message contains the resource information used by the RRM measurement corresponding to the changed neighbor node, or the resource information used by the RRM measurements corresponding to all the neighbor nodes after the change.

2. The RAN side node eNB of the LTE system configures the RRM measurement configuration for the UE.

The first node is the RAN side node eNB of the LTE system, and the second node is the RAN side node gNB of the NR system; and the X2 connection is established between the eNB and the gNB.

The gNB obtains the resource information used by the RRM measurement corresponding to a cell covered by its neighbor node, or the gNB obtains the resource information used by the RRM measurement corresponding to a frequency point of the cell covered by its neighbor node, and the gNB sends the obtained resource information used by the RRM measurement to the eNB.

In one embodiment, the gNB sends a first message to the eNB, where the first message carries the resource information used by at least one RRM measurement corresponding to a neighbor node of the gNB.

Correspondingly, the eNB receives the resource information carried in the first message sent by the gNB and used by at least one RRM measurement corresponding to the neighbor node of the gNB.

The first message is one of: an interface setup request message, a first interface setup response message, a secondary node addition request message, a secondary node modification request message, a secondary node modification requirement message.

Here, the interface setup request message is for requesting the interface setup. For example, the interface setup request message is an EN-DC X2 SETUP REQUEST message or an NE-DC X2 SETUP REQUEST message.

The first interface setup response message is for responding to the interface setup. For example, the first interface setup response message is an EN-DC X2 SETUP RESPONSE message or an NE-DC X2 SETUP RESPONSE message.

The secondary node addition request message is for requesting to add a secondary node. For example, the secondary node addition request message is an SENB ADDITION REQUEST message.

The secondary node modification request message is for requesting the secondary node to modify the related information. For example, the secondary node modification request message is an SENB MODIFICATION REQUEST message.

The secondary node modification requirement message is for the secondary node to actively request to modify the related information. For example, the secondary node modification requirement message is an SENB MODIFICATION REQUIRED message.

It should be noted that the above first message may be a non-UE-related interface message or a UE-related interface message when the first node and the second node are RAN side nodes of different systems.

In an embodiment of the application, the gNB sends a first update message to the eNB when it is determined that the following scenarios have occurred.

Scenario 1: the gNB determines that the resource information used by the RRM measurement corresponding to its neighbor node has changed.

The neighbor node of the gNB corresponds to the resource information used by at least one RRM measurement. As long as the resource information used by the RRM measurement corresponding to the neighbor node has changed, the gNB determines that the resource information used by the RRM measurement corresponding to the neighbor node has changed.

In one embodiment, the gNB determines that the resource information used by the RRM measurement corresponding to a cell covered by the neighbor node has changed, or the gNB determines that the resource information used by the RRM measurement corresponding to a frequency point of the cell covered by the neighbor node has changed.

Here, the change includes but not limited to: the increase in cells covered by the neighbor node, the decrease in cells covered by the neighbor node, and the change in the resource information used by the RRM measurement corresponding to the cell covered by the neighbor node.

For example, the neighbor nodes of the gNB include node A and node C; the cells covered by the node A include cell 1, cell 2 and cell 3, and the cells covered by the node C include cell 6 and cell 7. When the resource information used by the RRM measurement corresponding to the cell 2 covered by the node A changes, the eNB sends a first update message to the gNB; after the cells covered by the node C do not include the cell 6, the eNB sends a first update message to the gNB.

The first update message sent by the gNB to the eNB contains the changed resource information used by the RRM measurement corresponding to the neighbor node, or the first update message contains the resource information used by all the RRM measurement(s) corresponding to the neighbor node after the change.

It should be noted that, when the first update message contains the resource information used by all the RRM measurements corresponding to the neighbor node after the change, the first update message contains both the changed resource information used by the RRM measurement and the unchanged resource information used by the RRM measurement.

For example, the neighbor nodes of the gNB include node A and node B; the cells covered by the node A include cell 1, cell 2 and cell 3, and the cells covered by the node B include cell 4 and cell 5; assuming that the resource information used by the RRM measurement corresponding to the cell 3 changes, the first update message sent by the gNB to the eNB only includes the changed resource information used by the RRM measurement corresponding to the cell 3, or the first update message sent by the gNB to the eNB includes both the changed resource information used by the RRM measurement corresponding to the cell 3 and the resource information used by the RRM measurements corresponding to the cell 1, cell 2, cell 4 and cell 5.

Scenario 2: the gNB determines that the neighbor nodes of the gNB have changed.

The changes in neighbor nodes of the gNB include but not limited to: the decrease in neighbor nodes, the increase in neighbor nodes.

In one embodiment, when determining that the neighbor nodes have changed, the gNB determines the resource information used by the RRM measurement corresponding to the changed neighbor node.

The first update message sent by the gNB to the eNB contains the resource information used by the RRM measurement corresponding to the changed neighbor node, or the first update message contains the resource information used by the RRM measurements corresponding to all the neighbor nodes after the change.

For example, the neighbor nodes of the gNB include node A and node B; the cells covered by the node A include cell 1, cell 2 and cell 3, and the cells covered by the node B include cell 4 and cell 5; assuming that the gNB detects that a node C is added as a neighbor node, the first update message sent by the gNB to the eNB only includes the resource information used by the RRM measurement corresponding to the node C, or the first update message sent by the gNB to the eNB includes both the resource information used by the RRM measurement corresponding to the added node C and the resource information used by the RRM measurements corresponding to the nodes A and B. For another example, assuming the gNB detects a decrease in neighbor nodes, the gNB notifies the eNB which node has been deleted, and the first update message includes only deleted resource information used by the RRM measurement corresponding to the deleted node, or the first update message includes resource information used by the RRM measurements corresponding to all nodes except the deleted node. In some embodiments, the gNB has only one neighbor node, and assuming the gNB detects a decrease in the neighbor node, the field of the first update message may include the deleted neighbor node/the deleted info, or may be empty, in which case the first update message notifies the eNB that the gNB currently has no neighbor nodes.

Here, the first update message is a first configuration update message or a secondary node modification requirement message.

The first configuration update message is for informing the peer end that the relevant configuration has been updated. For example, the first configuration update message is an EN-DC CONFIGURATION UPDATE message or an NE-DC CONFIGURATION UPDATE message.

The secondary node modification requirement message is for the secondary node to actively request to modify the related information. For example, the secondary node modification requirement message is an SENB MODIFICATION REQUIRED message.

In an embodiment of the present application, after receiving the resource information used by the RRM measurement corresponding to the neighbor node sent by the gNB, the eNB determines the RRM measurement configuration required by the UE to perform the RRM measurement according to the received resource information used by the RRM measurement.

Here, the RRM measurement configuration required by the UE to perform the RRM measurement includes the measurement gap.

In an implementation, after receiving the resource information used by the RRM measurement corresponding to the neighbor node sent by the gNB, the eNB determines the RRM measurement configuration required by the UE to perform the RRM measurement in the following way: the eNB determines the resource information used by the RRM measurement corresponding to one or more frequency points configured for the UE from the resource information used by the RRM measurement corresponding to the neighbor node sent by the gNB; and determines the measurement gap according to the resource information used by the RRM measurement corresponding to the frequency point.

In one embodiment, the frequency point configured for the UE is an NR frequency point.

It should be noted that, when the eNB configures the measurement gap, it may be the measurement gap configuration for per UE or the measurement gap configuration for the FR1 frequency point.

Figure 4:
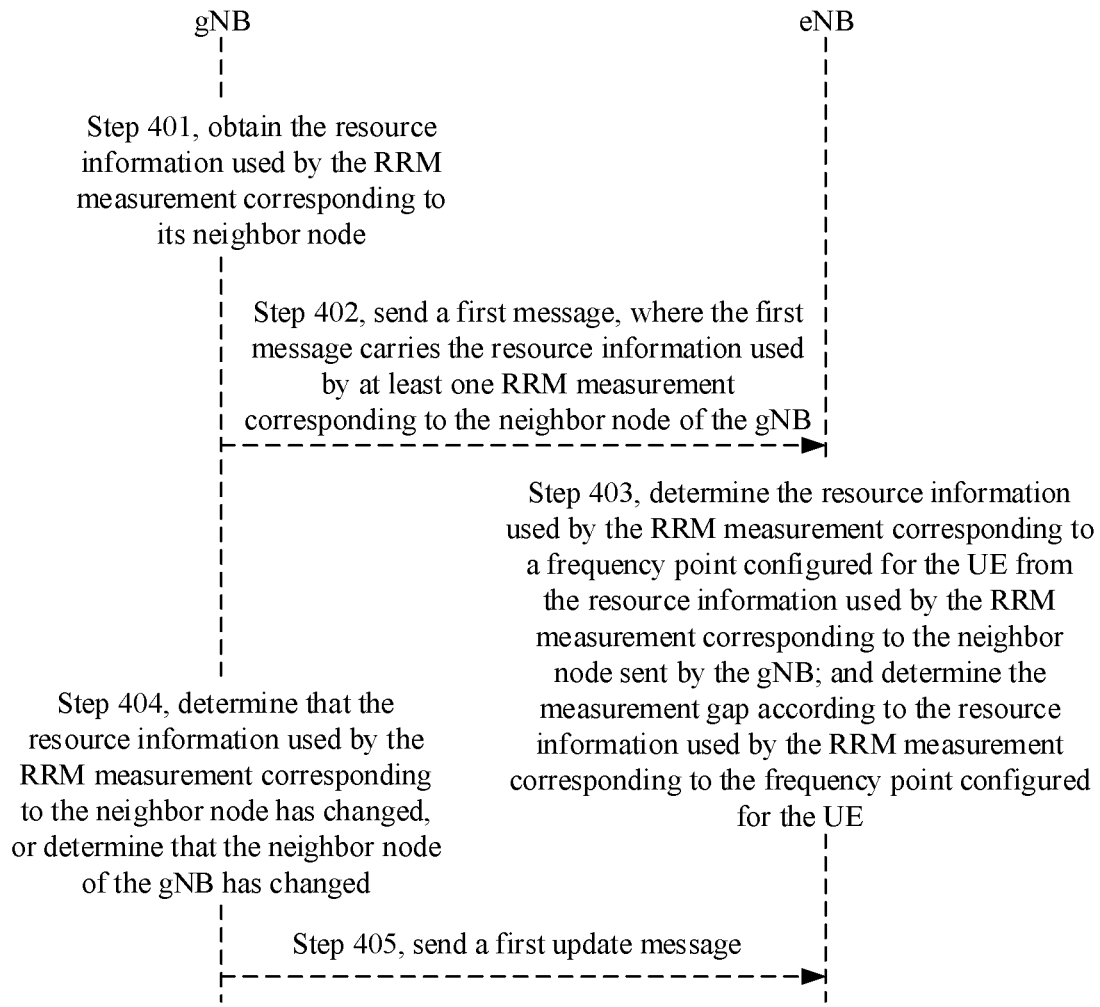
FIG. 4 is a second complete flowchart of determining the RRM measurement configuration according to an embodiment of the present application.

As shown in FIG. 4, an overall flowchart of a method for determining the RRM measurement configuration when the first node is an eNB and the second node is a gNB in an embodiment of the present application is shown.

Step 401, the gNB obtains the resource information used by the RRM measurement corresponding to its neighbor node.

Here, the resource information used by the RRM measurement corresponding to the neighbor node is the resource information used by the RRM measurement corresponding to a cell covered by the neighbor node, or the resource information used by the RRM measurement corresponding to a frequency point of a cell covered by the neighbor node.

Step 402, the gNB sends a first message to the eNB, where the first message carries the resource information used by at least one RRM measurement corresponding to the neighbor node of the gNB.

Step 403, the eNB determines the resource information used by the RRM measurement corresponding to a frequency point configured for the UE from the resource information used by the RRM measurement corresponding to the neighbor node sent by the gNB; and determines the measurement gap according to the resource information used by the RRM measurement corresponding to the frequency point configured for the UE.

Step 404, the gNB determines that the resource information used by the RRM measurement corresponding to the neighbor node has changed, or determines that the neighbor node of the gNB has changed.

Step 405, the gNB sends a first update message to the eNB.

Here, the first update message contains the changed resource information used by the RRM measurement corresponding to the neighbor node, or the resource information used by all the RRM measurements corresponding to the neighbor node after the change; or the first update message contains the resource information used by the RRM measurement corresponding to the changed neighbor node, or the resource information used by the RRM measurements corresponding to all the neighbor nodes after the change.

Case 2: the first node and the second node are RAN side nodes of the NR system.

In an embodiment of the present application, the first node is a DU node of the NR system, and the second node is a CU node of the NR system; and the DU node and the CU node are connected through an F1 interface. The DU node configures the RRM measurement configuration for the UE.

The CU node obtains the resource information used by the RRM measurement corresponding to a cell covered by the neighbor node, or the CU node obtains the resource information used by the RRM measurement corresponding to a frequency point of the cell covered by the neighbor node, and the CU node sends the obtained resource information used by the RRM measurement to the DU node.

In one embodiment, the CU node sends a second message to the DU node, where the second message carries the resource information used by at least one RRM measurement corresponding to the neighbor node.

Correspondingly, the DU node receives the resource information carried in the second message sent by the CU node and used by at least one RRM measurement corresponding to the neighbor node of the CU node.

The second message is one of: a second interface setup response message, a UE context setup request message, a UE context modification request message.

Here, the second interface setup response message is for responding to the interface setup. For example, the second interface setup response message is an F1 SETUP RESPONSE message.

The UE context setup request message is for requesting to set up the UE context. For example, the UE context setup request message is a UE CONTEXT SETUP REQUEST message.

The UE context modification request message is for requesting to modify the UE context. For example, the UE context modification request message is a UE CONTEXT MODIFICATION REQUEST message.

It should be noted that the above second message may be a non-UE-related interface message or a UE-related interface message.

Here, the second interface setup response message may be an F1 SETUP RESPONSE message; the UE context setup request message may be a UE CONTEXT SETUP REQUEST message; and the UE context modification request message may be a UE CONTEXT MODIFICATION REQUEST message.

It should be noted that the above second message may be a non-UE-related interface message or a UE-related interface message.

In an embodiment of the application, the CU node sends a second update message to the DU node when determining that the following scenarios have occurred.

Scenario 1: the CU node determines that the resource information used by the RRM measurement corresponding to its neighbor node has changed.

The neighbor node of the CU node corresponds to the resource information used by at least one RRM measurement. As long as the resource information used by the RRM measurement corresponding to the neighbor node has changed, the CU node determines that the resource information used by the RRM measurement corresponding to the neighbor node has changed.

In one embodiment, the CU node determines that the resource information used by the RRM measurement corresponding to a cell covered by the neighbor node has changed, or the CU node determines that the resource information used by the RRM measurement corresponding to a frequency point of the cell covered by the neighbor node has changed.

Here, the change includes but not limited to: the increase in cells covered by the neighbor node, the decrease in cells covered by the neighbor node, and the change in the resource information used by the RRM measurement corresponding to the cell covered by the neighbor node.

For example, the neighbor nodes of the CU node include node C and node D; the cells covered by the node C include cell 2 and cell 3, and the cells covered by the node D include cell 5 and cell 4. When the resource information used by the RRM measurement corresponding to the cell 2 covered by the node C changes, the CU node sends a second update message to the DU node; or when the cell 1 is added to the cells covered by the node D, the CU node sends a second update message to the DU node.

The second update message sent by the CU node to the DU node contains the changed resource information used by the RRM measurement corresponding to the neighbor node, or the second update message contains the resource information used by all the RRM measurements corresponding to the neighbor node after the change.

It should be noted that, when the second update message contains the resource information used by all the RRM measurements corresponding to the neighbor node after the change, the second update message contains both the changed resource information used by the RRM measurement and the unchanged resource information used by the RRM measurement.

For example, the neighbor nodes of the CU node include node C and node D; the cells covered by the node C include cell 2 and cell 3, and the cells covered by the node D include cell 5 and cell 4. Assuming that the resource information used by the RRM measurement corresponding to the cell 3 changes, the second update message sent by the CU node to the DU node only includes the changed resource information used by the RRM measurement corresponding to the cell 3, or the second update message sent by the CU node to the DU node includes both the changed resource information used by the RRM measurement corresponding to the cell 3 and the resource information used by the RRM measurements corresponding to the cell 2, cell 4 and cell 5.

Scenario 2: the CU node determines that the neighbor nodes have changed.

The changes in neighbor nodes include but not limited to: the decrease in neighbor nodes, the increase in neighbor nodes.

In one embodiment, when determining that the neighbor nodes have changed, the CU node determines the resource information used by the RRM measurement corresponding to the changed neighbor node.

The second update message sent by the CU node to the DU node contains the resource information used by the RRM measurement corresponding to the changed neighbor node, or the second update message contains the resource information used by the RRM measurements corresponding to all the neighbor nodes after the change.

For example, the neighbor nodes of the CU node include node C and node D; the cells covered by the node C include cell 2 and cell 3, and the cells covered by the node D include cell 4 and cell 5; assuming that the CU node detects that a node E is added as a neighbor node, the second update message sent by the CU node to the DU node only includes the resource information used by the RRM measurement corresponding to the node E, or the second update message sent by the CU node to the DU node includes both the resource information used by the RRM measurement corresponding to the added node E and the resource information used by the RRM measurements corresponding to the nodes C and D. For another example, assuming the CU node detects a decrease in neighbor nodes, the CU node notifies the DU node which node has been deleted, and the second update message includes only deleted resource information used by the RRM measurement corresponding to the deleted node, or the second update message includes resource information used by the RRM measurements corresponding to all nodes except the deleted node. In some embodiments, the CU node has only one neighbor node, and assuming the CU node detects a decrease in the neighbor node, the field of the second update message may include the deleted neighbor node/the deleted info, or may be empty, in which case the second update message notifies the DU node that the CU node currently has no neighbor nodes.

Here, the second update message is a second configuration update message or a UE context modification request message.

The second configuration update message is for the configuration update between interfaces. For example, the second configuration update message is a GNB-CU CONFIGURATION UPDATE message.

The UE context modification request message is for requesting to modify the UE context. For example, the UE context modification request message is a UE CONTEXT MODIFICATION REQUEST message.

In an embodiment of the present application, after receiving the resource information used by the RRM measurement corresponding to the neighbor node sent by the CU node, the DU node determines the RRM measurement configuration required by the UE to perform the RRM measurement according to the received resource information used by the RRM measurement; where the RRM measurement configuration required by the UE to perform the RRM measurement includes the measurement gap.

In an implementation, after receiving the resource information used by the RRM measurement corresponding to the neighbor node sent by the CU node, the DU node determines the RRM measurement configuration required by the UE to perform the RRM measurement in the following way: the DU node determines the resource information used by the RRM measurement corresponding to one or more frequency points configured for the UE from the resource information used by the RRM measurement corresponding to the neighbor node sent by the CU node; and determines the measurement gap according to the resource information used by the RRM measurement corresponding to the frequency point configured for the UE.

In one embodiment, the frequency point configured for the UE is an NR frequency point.

It should be noted that, when the DU node configures the measurement gap, it may be the measurement gap configuration for per UE or the measurement gap configuration for the FR1 frequency point.

Figure 5:
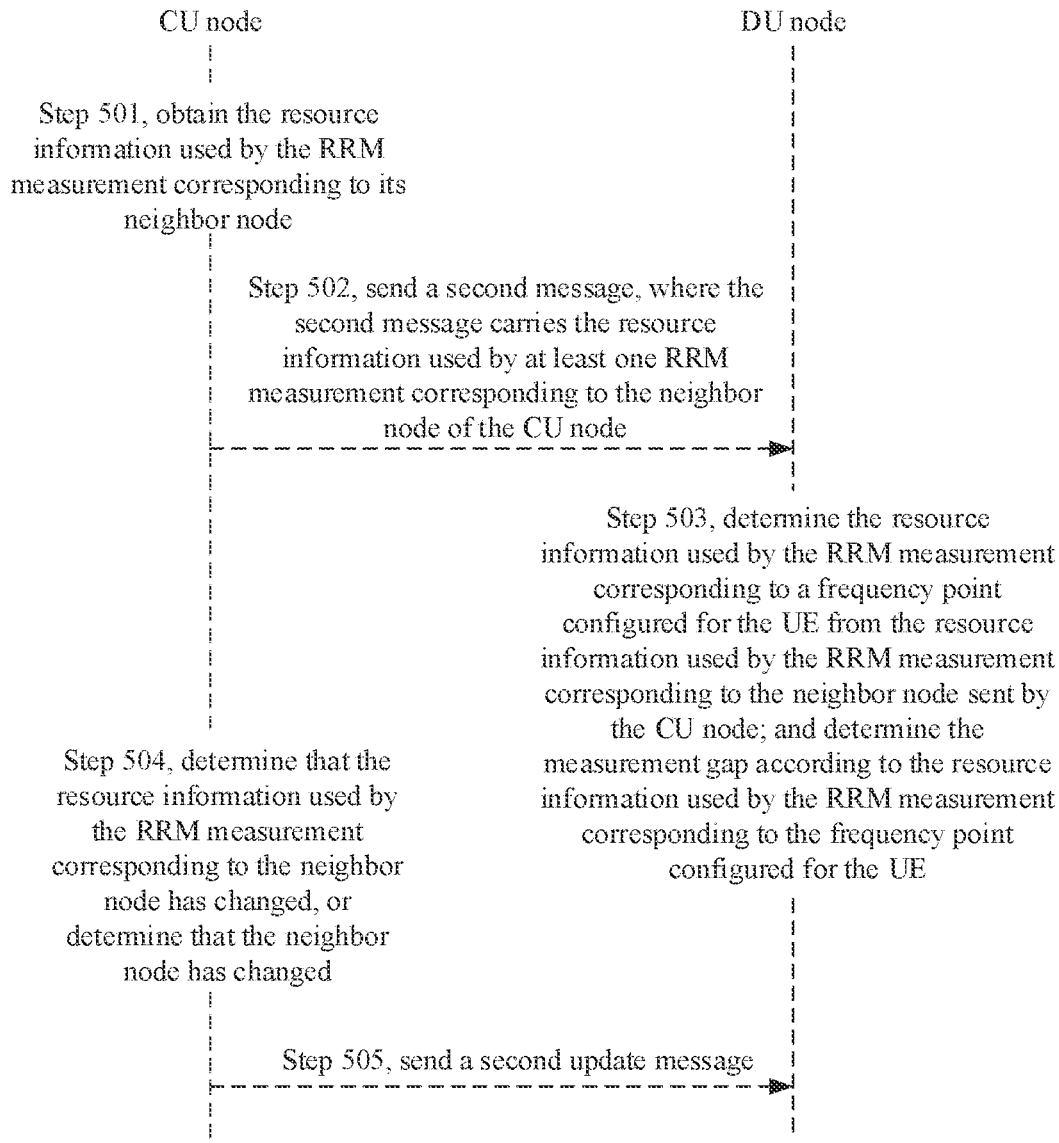
FIG. 5 is a third complete flowchart of determining the RRM measurement configuration according to an embodiment of the present application.

As shown in FIG. 5, an overall flowchart of a method for determining the RRM measurement configuration when the first node is a DU node and the second node is a CU node in an embodiment of the present application is shown.

Step 501: the CU node obtains the resource information used by the RRM measurement corresponding to its neighbor node.

Here, the resource information used by the RRM measurement corresponding to the neighbor node is the resource information used by the RRM measurement corresponding to a cell covered by the neighbor node, or the resource information used by the RRM measurement corresponding to a frequency point of a cell covered by the neighbor node.

Step 502: the CU node sends a second message to the DU node, where the second message carries the resource information used by at least one RRM measurement corresponding to the neighbor node.

Step 503: the DU node determines the resource information used by the RRM measurement corresponding to a frequency point configured for the UE from the resource information used by the RRM measurement corresponding to the neighbor node sent by the CU node; and determines the measurement gap according to the resource information used by the RRM measurement corresponding to the frequency point configured for the UE.

Step 504: the CU node determines that the resource information used by the RRM measurement corresponding to the neighbor node has changed, or determines that the neighbor node has changed.

Step 505: the CU node sends a second update message to the DU node.

Here, the second update message contains the changed resource information used by the RRM measurement corresponding to the neighbor node, or the resource information used by all the RRM measurements corresponding to the neighbor node after the change; or the second update message contains the resource information used by the RRM measurement corresponding to the changed neighbor node, or the resource information used by the RRM measurements corresponding to all the neighbor nodes after the change.

Figure 6:
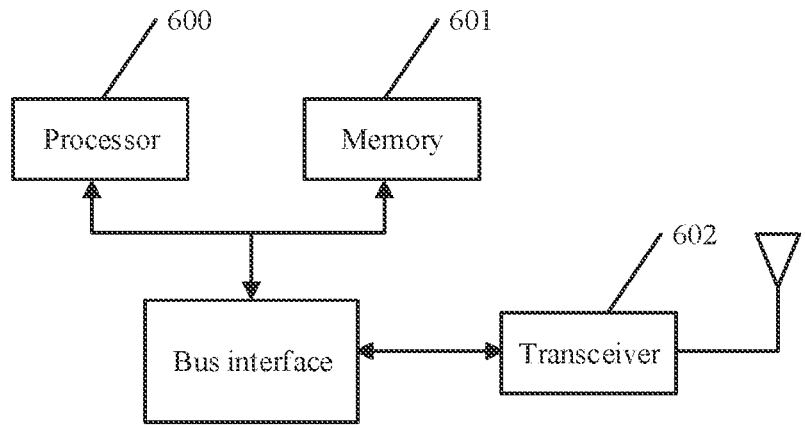
FIG. 6 is a structural schematic diagram of a first kind of first node for determining the RRM measurement configuration according to an embodiment of the present application.

As shown in FIG. 6, an embodiment of the present application provides a first kind of first node for determining the RRM measurement configuration, where the first node includes: a processor 600, a memory 601 and a transceiver 602. The processor 600 is configured to read a program in the memory 601 and perform the process of: receiving the resource information sent by a second node and used by at least one RRM measurement corresponding to a neighbor node of the second node; and determining the RRM measurement configuration required for a UE to perform the RRM measurement according to the resource information used by the at least one RRM measurement.

In one embodiment, the resource information used by the at least one RRM measurement corresponding to the neighbor node is: the resource information of an RRM measurement corresponding to a cell covered by the neighbor node; or the resource information of an RRM measurement corresponding to a frequency point of a cell covered by the neighbor node.

In one embodiment, the resource information used by the RRM measurement includes: the resource information corresponding to an SSB and/or the resource information corresponding to a CSI-RS.

In one embodiment, the resource information is a time-domain position and/or a frequency-domain position.

In one embodiment, the first node is an RAN side node of a NR system, and the second node is an RAN side node of an LTE system; or the first node is an RAN side node of the LTE system, and the second node is an RAN side node of the NR system.

In one embodiment, the processor 600 is configured to: receive the resource information carried in a first message sent by the second node and used by at least one RRM measurement corresponding to a neighbor node of the second node.

In one embodiment, the first message is one of: an interface setup request message, a first interface setup response message, a secondary node addition request message, a secondary node modification request message, a secondary node modification requirement message.

In one embodiment, the processor 600 is further configured to: receive a first update message sent by the second node; where the first update message is sent after the second node determines that the resource information used by an RRM measurement corresponding to the neighbor node has changed, and the first update message contains changed resource information used by the RRM measurement corresponding to the neighbor node, or the first update message contains resource information used by all RRM measurements corresponding to the neighbor node after the change; or the first update message is sent after the second node determines that one neighbor node of the second node has changed, and the first update message contains resource information used by an RRM measurement corresponding to a changed neighbor node, or the first update message contains resource information used by RRM measurements corresponding to all neighbor nodes after the change.

In one embodiment, the first update message is a first configuration update message or a secondary node modification requirement message.

In one embodiment, when the first node is the RAN side node of the NR system and the second node is the RAN side node of the LTE system, the processor 600 is configured to: determine one or more measurement objects that the UE needs to measure according to the resource information used by the at least one RRM measurement; and/or determine the resource information used by the RRM measurement corresponding to one or more frequency points configured for the UE from the resource information used by the at least one RRM measurement; and determine a measurement gap according to the resource information used by the RRM measurement corresponding to the frequency point configured for the UE.

In one embodiment, the frequency point configured for the UE is an FR2 frequency point.

In one embodiment, when the first node is the RAN side node of the LTE system and the second node is the RAN side node of the NR system, the processor 600 is configured to: determine the resource information used by the RRM measurement corresponding to one or more frequency points configured for the UE from the resource information used by the at least one RRM measurement; and determine a measurement gap according to the resource information used by the RRM measurement corresponding to the frequency point configured for the UE.

In one embodiment, the frequency point configured for the UE is an NR frequency point.

In one embodiment, the first node is a DU node of the NR system, and the second node is a CU node of the NR system.

In one embodiment, the processor 600 is configured to: receive the resource information carried in a second message sent by the second node and used by at least one RRM measurement corresponding to a neighbor node of the second node.

In one embodiment, the second message is one of: a second interface setup response message, a UE context setup request message, and a UE context modification request message.

In one embodiment, the processor 600 is further configured to: receive a second update message sent by the second node; where the second update message is sent after the second node determines that the resource information used by an RRM measurement corresponding to the neighbor node has changed, and the second update message contains changed resource information used by the RRM measurement corresponding to the neighbor node, or the second update message contains resource information used by all RRM measurements corresponding to the neighbor node after the change; or the second update message is sent after the second node determines that one neighbor node of the second node has changed, and the second update message contains resource information used by an RRM measurement corresponding to a changed neighbor node, or the second update message contains resource information used by RRM measurements corresponding to all neighbor nodes after the change.

In one embodiment, the second update message is a second configuration update message or a UE context modification request message.

In one embodiment, the processor 600 is configured to: determine the resource information used by the RRM measurement corresponding to one or more frequency points configured for the UE from the resource information used by the at least one RRM measurement; and determine a measurement gap according to the resource information used by the RRM measurement corresponding to the frequency point configured for the UE.

In one embodiment, the frequency point configured for the UE is an NR frequency point.

The processor 600 is responsible for managing the bus architecture and general processing, and the memory 601 may store the data used by the processor 600 when performing the operations. The transceiver 602 is configured to receive and send the data under the control of the processor 600.

The bus architecture may include any numbers of interconnected buses and bridges, and link various circuits of one or more processors represented by the processor 600 and the memory represented by the memory 601. The bus architecture may further link various other circuits such as peripheral device, voltage regulator and power management circuit, which are all well known in the art and thus will not be further described again herein. The bus interface provides an interface. The processor 600 is responsible for managing the bus architecture and general processing, and the memory 601 may store the data used by the processor 600 when performing the operations.

The procedure disclosed by the embodiment of the present application may be applied in the processor 600 or implemented by the processor 600. In the implementation process, each step of the signal processing flow may be completed by the integrated logic circuit of hardware in the processor 600 or the instruction in the form of software. The processor 600 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 601, and the processor 600 reads the information in the memory 601 and completes the steps of the signal processing flow in combination with its hardware.

Figure 7:
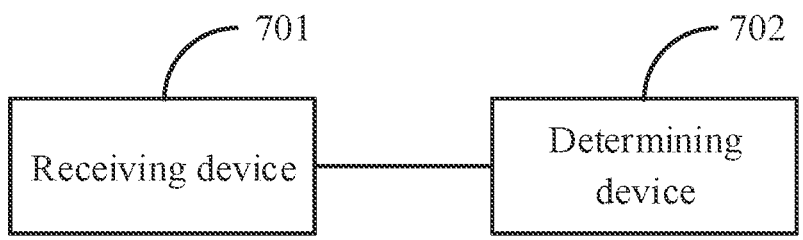
FIG. 7 is a structural schematic diagram of a second kind of first node for determining the RRM measurement configuration according to an embodiment of the present application.

As shown in FIG. 7, a second kind of first node for determining the RRM measurement configuration provided by an embodiment of the present application includes:

a receiving device 701 configured to receive the resource information sent by a second node and used by at least one RRM measurement corresponding to a neighbor node of the second node; and a determining device 702 configured to determine the RRM measurement configuration required for a UE to perform the RRM measurement according to the resource information used by the at least one RRM measurement.

In one embodiment, the resource information used by the at least one RRM measurement corresponding to the neighbor node is: the resource information of an RRM measurement corresponding to a cell covered by the neighbor node; or the resource information of an RRM measurement corresponding to a frequency point of a cell covered by the neighbor node.

In one embodiment, the resource information used by the at least one RRM measurement includes: the resource information corresponding to an SSB and/or the resource information corresponding to a CSI-RS.

In one embodiment, the resource information is a time-domain position and/or a frequency-domain position.

In one embodiment, the first node is an RAN side node of a NR system, and the second node is an RAN side node of an LTE system; or the first node is an RAN side node of the LTE system, and the second node is an RAN side node of the NR system.

In one embodiment, the receiving device 701 is configured to: receive the resource information carried in a first message sent by the second node and used by at least one RRM measurement corresponding to a neighbor node of the second node.

In one embodiment, the first message is one of: an interface setup request message, a first interface setup response message, a secondary node addition request message, a secondary node modification request message, a secondary node modification requirement message.

In one embodiment, the receiving device 701 is further configured to: receive a first update message sent by the second node; where the first update message is sent after the second node determines that the resource information used by an RRM measurement corresponding to the neighbor node has changed, and the first update message contains changed resource information used by the RRM measurement corresponding to the neighbor node, or the first update message contains resource information used by all RRM measurements corresponding to the neighbor node after the change; or the first update message is sent after the second node determines that one neighbor node of the second node has changed, and the first update message contains resource information used by an RRM measurement corresponding to a changed neighbor node, or the first update message contains resource information used by RRM measurements corresponding to all neighbor nodes after the change.

In one embodiment, the first update message is a first configuration update message or a secondary node modification requirement message.

In one embodiment, when the first node is the RAN side node of the NR system and the second node is the RAN side node of the LTE system, the determining device 702 is configured to: determine one or more measurement objects that the UE needs to measure according to the resource information used by the at least one RRM measurement; and/or determine the resource information used by the RRM measurement corresponding to one or more frequency points configured for the UE from the resource information used by the at least one RRM measurement; and determine a measurement gap according to the resource information used by the RRM measurement corresponding to the frequency point configured for the UE.

In one embodiment, the frequency point configured for the UE is an FR2 frequency point.

In one embodiment, when the first node is the RAN side node of the LTE system and the second node is the RAN side node of the NR system, the determining device 702 is configured to: determine the resource information used by the RRM measurement corresponding to one or more frequency points configured for the UE from the resource information used by the at least one RRM measurement; and determine a measurement gap according to the resource information used by the RRM measurement corresponding to the frequency point configured for the UE.

In one embodiment, the frequency point configured for the UE is an NR frequency point.

In one embodiment, the first node is a DU node of the NR system, and the second node is a CU node of the NR system.

In one embodiment, the receiving device 701 is configured to: receive the resource information carried in a second message sent by the second node and used by at least one RRM measurement corresponding to a neighbor node of the second node.

In one embodiment, the second message is one of: a second interface setup response message, a UE context setup request message, a UE context modification request message.

In one embodiment, the receiving device 701 is further configured to: receive a second update message sent by the second node; where the second update message is sent after the second node determines that the resource information used by an RRM measurement corresponding to the neighbor node has changed, and the second update message contains changed resource information used by the RRM measurement corresponding to the neighbor node, or the second update message contains resource information used by all RRM measurements corresponding to the neighbor node after the change; or the second update message is sent after the second node determines that one neighbor node of the second node has changed, and the second update message contains resource information used by an RRM measurement corresponding to a changed neighbor node, or the second update message contains resource information used by RRM measurements corresponding to all neighbor nodes after the change.

In one embodiment, the second update message is a second configuration update message or a UE context modification request message.

In one embodiment, the determining device 702 is configured to: determine the resource information used by the RRM measurement corresponding to one or more frequency points configured for the UE from the resource information used by the at least one RRM measurement; and determine a measurement gap according to the resource information used by the RRM measurement corresponding to the frequency point configured for the UE.

In one embodiment, the frequency point configured for the UE is an NR frequency point.

An embodiment of the present application provides a computer storage medium, which is a non-volatile readable storage medium and includes the program codes which enables, when running on a computing device, the computing device to perform the above-mentioned steps of the first node to determine the RRM measurement configuration.

Based on the same inventive concept, an embodiment of the present application further provides a method for determining the RRM measurement configuration. Since the principle solving the problem of this method is similar to that of the system for determining the RRM measurement configuration in the embodiments of the present application, the implementations of this method can refer to the implementations of the system, and the repeated description thereof will be omitted here.

Figure 8:
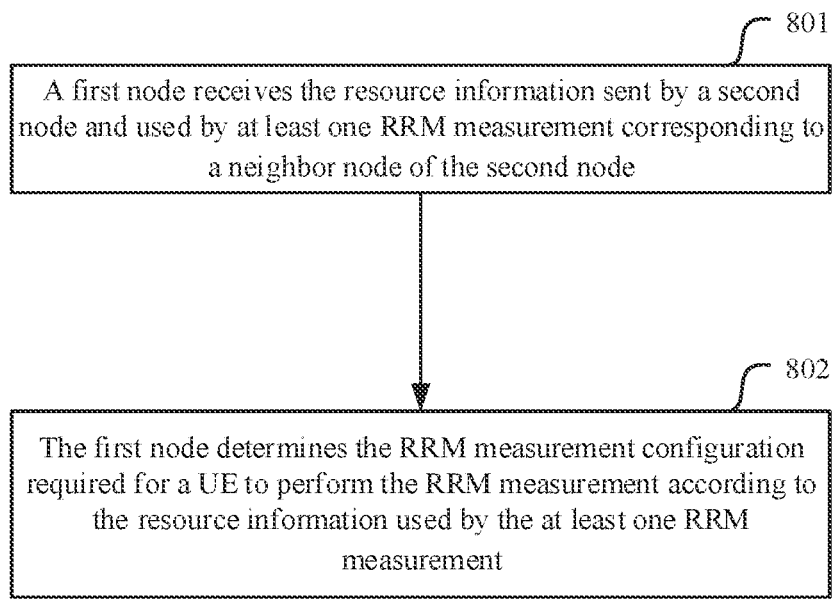
FIG. 8 is a flowchart of determining the RRM measurement configuration according to an embodiment of the present application.

As shown in FIG. 8, a method for determining the RRM measurement configuration in an embodiment of the present application includes as follows.

Step 801, a first node receives the resource information sent by a second node and used by at least one RRM measurement corresponding to a neighbor node of the second node.

Step 802, the first node determines the RRM measurement configuration required for a UE to perform the RRM measurement according to the resource information used by the at least one RRM measurement.

In one embodiment, the resource information used by the at least one RRM measurement corresponding to the neighbor node is: the resource information of an RRM measurement corresponding to a cell covered by the neighbor node; or the resource information of an RRM measurement corresponding to a frequency point of a cell covered by the neighbor node.

In one embodiment, the resource information used by the at least one RRM measurement includes: the resource information corresponding to an SSB and/or the resource information corresponding to a CSI-RS.

In one embodiment, the resource information is a time-domain position and/or a frequency-domain position.

In one embodiment, the first node is an RAN side node of a NR system, and the second node is an RAN side node of an LTE system; or the first node is an RAN side node of the LTE system, and the second node is an RAN side node of the NR system.

In one embodiment, the first node receives the resource information sent by the second node and used by at least one RRM measurement corresponding to the neighbor node of the second node, including: the first node receives the resource information carried in a first message sent by the second node and used by at least one RRM measurement corresponding to the neighbor node of the second node.

In one embodiment, the first message is one of: an interface setup request message, a first interface setup response message, a secondary node addition request message, a secondary node modification request message, a secondary node modification requirement message.

In one embodiment, the method further includes: the first node receives a first update message sent by the second node; where the first update message is sent after the second node determines that the resource information used by an RRM measurement corresponding to the neighbor node has changed, and the first update message contains changed resource information used by the RRM measurement corresponding to the neighbor node, or the first update message contains resource information used by all RRM measurements corresponding to the neighbor node after the change; or the first update message is sent after the second node determines that one neighbor node of the second node has changed, and the first update message contains resource information used by an RRM measurement corresponding to a changed neighbor node, or the first update message contains resource information used by RRM measurements corresponding to all neighbor nodes after the change.

In one embodiment, the first update message is a first configuration update message or a secondary node modification requirement message.

In one embodiment, when the first node is the RAN side node of the NR system and the second node is the RAN side node of the LTE system, the step in which the first node determines the RRM measurement configuration required for the UE to perform the RRM measurement according to the resource information used by the at least one RRM measurement includes: the first node determines one or more measurement objects that the UE needs to measure according to the resource information used by the at least one RRM measurement; and/or the first node determines the resource information used by the RRM measurement corresponding to one or more frequency points configured for the UE from the resource information used by the at least one RRM measurement; and determines a measurement gap according to the resource information used by the RRM measurement corresponding to the frequency point configured for the UE.

In one embodiment, the frequency point configured for the UE is an FR2 frequency point.

In one embodiment, when the first node is the RAN side node of the LTE system and the second node is the RAN side node of the NR system, the step in which the first node determines the RRM measurement configuration required for the UE to perform the RRM measurement according to the resource information used by the at least one RRM measurement includes: the first node determines the resource information used by the RRM measurement corresponding to one or more frequency points configured for the UE from the resource information used by the at least one RRM measurement; and determines a measurement gap according to the resource information used by the RRM measurement corresponding to the frequency point configured for the UE.

In one embodiment, the frequency point configured for the UE is an NR frequency point.

In one embodiment, the first node is a DU node of the NR system, and the second node is a CU node of the NR system.

In one embodiment, the first node receives the resource information sent by the second node and used by at least one RRM measurement corresponding to the neighbor node of the second node, including: the first node receives the resource information carried in a second message sent by the second node and used by at least one RRM measurement corresponding to the neighbor node of the second node.

In one embodiment, the second message is one of: a second interface setup response message, a UE context setup request message, a UE context modification request message.

In one embodiment, the method further includes: the first node receives a second update message sent by the second node; where the second update message is sent after the second node determines that the resource information used by an RRM measurement corresponding to the neighbor node has changed, and the second update message contains changed resource information used by the RRM measurement corresponding to the neighbor node, or the second update message contains resource information used by all RRM measurements corresponding to the neighbor node after the change; or the second update message is sent after the second node determines that one neighbor node of the second node has changed, and the second update message contains resource information used by an RRM measurement corresponding to a changed neighbor node, or the second update message contains resource information used by RRM measurements corresponding to all neighbor nodes after the change.

In one embodiment, the second update message is a second configuration update message or a UE context modification request message.

In one embodiment, the first node determines the RRM measurement configuration required for the UE to perform the RRM measurement according to the resource information used by the at least one RRM measurement, including: the first node determines the resource information used by the RRM measurement corresponding to one or more frequency points configured for the UE from the resource information used by the at least one RRM measurement; and determines a measurement gap according to the resource information used by the RRM measurement corresponding to the frequency point configured for the UE.

In one embodiment, the frequency point configured for the UE is an NR frequency point.

Embodiments of the present application can provide methods, systems and computer program products. Thus, the present application can take the form of hardware embodiments alone, application embodiments alone, or embodiments combining the application and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A method for determining Radio Resource Management (RRM) measurement configuration, comprising:
   receiving, by a first node, resource information sent by a second node and used by at least one RRM measurement corresponding to a neighbor node of the second node; and
   determining, by the first node, RRM measurement configuration required for a User Equipment (UE) to perform an RRM measurement according to the resource information used by the at least one RRM measurement.

2. The method of claim 1, wherein the resource information used by the at least one RRM measurement corresponding to the neighbor node is:
   resource information of an RRM measurement corresponding to a cell covered by the neighbor node; or
   resource information of an RRM measurement corresponding to a frequency point of a cell covered by the neighbor node.

3. The method of claim 1, wherein the resource information used by the at least one RRM measurement comprises:
   resource information corresponding to a Synchronization Signal Block (SSB); or
   resource information corresponding to a Channel State Information-Reference Signal (CSI-RS); or
   resource information corresponding to a SSB and resource information corresponding to a CSI-RS.

4. The method of claim 1, wherein the resource information is:
   a time-domain position, or
   a frequency-domain position, or
   a time-domain position and a frequency-domain position.

5. The method of claim 1, wherein:
   the first node is a Radio Access Network (RAN) side node of a New Radio access (NR) system, and the second node is an RAN side node of a Long Term Evolution (LTE) system, and the receiving, by the first node, the resource information sent by the second node and used by the at least one RRM measurement corresponding to the neighbor node of the second node, comprises:
   receiving, by the first node, the resource information carried in a first message sent by the second node and used by the at least one RRM measurement corresponding to the neighbor node of the second node; or
   the first node is an RAN side node of an LTE system, and the second node is an RAN side node of a NR system, and the receiving, by the first node, the resource information sent by the second node and used by the at least one RRM measurement corresponding to the neighbor node of the second node, comprises:
   receiving, by the first node, the resource information carried in a first message sent by the second node and used by the at least one RRM measurement corresponding to the neighbor node of the second node.

6. The method of claim 5, wherein the first message is one of:
   an interface setup request message,
   a first interface setup response message,
   a secondary node addition request message,
   a secondary node modification request message, and a secondary node modification requirement message.

7. The method of claim 5, further comprising:
   receiving, by the first node, a first update message sent by the second node;
   wherein the first update message is sent after the second node determines that the resource information used by an RRM measurement corresponding to the neighbor node has changed, and the first update message comprises:
   changed resource information used by the RRM measurement corresponding to the neighbor node, or
   resource information used by all RRM measurements corresponding to the neighbor node; or
   wherein the first update message is sent after the second node determines that one neighbor node of the second node has changed, and the first update message comprises:
   resource information used by an RRM measurement corresponding to a changed neighbor node, or
   resource information used by RRM measurements corresponding to all neighbor nodes.

8. The method of claim 5, wherein when the first node is the RAN side node of the NR system and the second node is the RAN side node of the LTE system, the determining, by the first node, the RRM measurement configuration required for the UE to perform the RRM measurement according to the resource information used by the at least one RRM measurement, comprises:
   determining, by the first node, a measurement object measured by the UE according to the resource information used by the at least one RRM measurement; and/or
   determining, by the first node, resource information used by an RRM measurement corresponding to a frequency point configured for the UE from the resource information used by the at least one RRM measurement; and determining a measurement gap according to the resource information used by the RRM measurement corresponding to the frequency point configured for the UE.

9. The method of claim 5, wherein when the first node is the RAN side node of the LTE system and the second node is the RAN side node of the NR system, the determining, by the first node, the RRM measurement configuration required for the UE to perform the RRM measurement according to the resource information used by the at least one RRM measurement, comprises:
   determining, by the first node, resource information used by an RRM measurement corresponding to a frequency point configured for the UE from the resource information used by the at least one RRM measurement; and determining a measurement gap according to the resource information used by the RRM measurement corresponding to the frequency point configured for the UE.

10. The method of claim 1, wherein the first node is a Distributed Unit (DU) node of an NR system, and the second node is a Central Unit (CU) node of the NR system, and the receiving, by the first node, the resource information sent by the second node and used by the at least one RRM measurement corresponding to the neighbor node of the second node, comprises:
    receiving, by the first node, resource information carried in a second message sent by the second node and used by the at least one RRM measurement corresponding to the neighbor node of the second node.

11. The method of claim 10, wherein the second message is one of:
    a second interface setup response message,
    a UE context setup request message, and
    a UE context modification request message.

12. The method of claim 10, further comprising:
receiving, by the first node, a second update message sent by the second node;
wherein the second update message is sent after the second node determines that the resource information used by an RRM measurement corresponding to the neighbor node has changed, and the second update message comprises:
changed resource information used by the RRM measurement corresponding to the neighbor node, or
resource information used by all RRM measurements corresponding to the neighbor node; or
wherein the second update message is sent after the second node determines that one neighbor node of the second node has changed, and the second update message comprises:
resource information used by an RRM measurement corresponding to a changed neighbor node, or
resource information used by RRM measurements corresponding to all neighbor nodes.

13. The method of claim 10, wherein the determining, by the first node, the RRM measurement configuration required for the UE to perform the RRM measurement according to the resource information used by the at least one RRM measurement, comprises:
determining, by the first node, resource information used by an RRM measurement corresponding to a frequency point configured for the UE from the resource information used by the at least one RRM measurement; and determining a measurement gap according to the resource information used by the RRM measurement corresponding to the frequency point configured for the UE.

14. A first node for determining Radio Resource Management (RRM) measurement configuration, comprising: a processor, a memory and a transceiver;
wherein the processor is configured to read a program in the memory and perform the process of:
receiving resource information sent by a second node and used by at least one RRM measurement corresponding to a neighbor node of the second node; and
determining RRM measurement configuration required for a User Equipment (UE) to perform an RRM measurement according to the resource information used by the at least one RRM measurement.

15. The first node of claim 14, wherein the resource information used by the at least one RRM measurement corresponding to the neighbor node is:
resource information of an RRM measurement corresponding to a cell covered by the neighbor node; or
resource information of an RRM measurement corresponding to a frequency point of a cell covered by the neighbor node.

16. The first node of claim 14, wherein the resource information used by the at least one RRM measurement comprises:
resource information corresponding to a Synchronization Signal Block (SSB); or
resource information corresponding to a Channel State Information-Reference Signal (CSI-RS); or
resource information corresponding to a SSB and resource information corresponding to a CSI-RS.

17. The first node of claim 14, wherein the resource information is:
a time-domain position, or
a frequency-domain position, or
a time-domain position and a frequency-domain position.

18. The first node of claim 14, the first node is an RAN side node of a NR system, and the second node is an RAN side node of an LTE system; or
the first node is an RAN side node of an LTE system, and the second node is an RAN side node of a NR system;
the processor is further configured to:
receive the resource information carried in a first message sent by the second node and used by the at least one RRM measurement corresponding to the neighbor node of the second node.

19. The first node of claim 18, wherein the first message is one of:
an interface setup request message,
a first interface setup response message,
a secondary node addition request message,
a secondary node modification request message, and
a secondary node modification requirement message.

20. The first node of claim 18, the processor is further configured to:
receive a first update message sent by the second node;
wherein the first update message is sent after the second node determines that the resource information used by an RRM measurement corresponding to the neighbor node has changed, and the first update message comprises:
changed resource information used by the RRM measurement corresponding to the neighbor node, or
resource information used by all RRM measurements corresponding to the neighbor node; or
wherein the first update message is sent after the second node determines that one neighbor node of the second node has changed, and the first update message comprises:
resource information used by an RRM measurement corresponding to a changed neighbor node, or
resource information used by RRM measurements corresponding to all neighbor nodes.

21. The first node of claim 18, when the first node is the RAN side node of the NR system and the second node is the RAN side node of the LTE system, the processor is further configured to:
determine a measurement object measured by the UE according to the resource information used by the at least one RRM measurement; and/or
determine resource information used by an RRM measurement corresponding to a frequency point configured for the UE from the resource information used by the at least one RRM measurement; and determine a measurement gap according to the resource information used by the RRM measurement corresponding to the frequency point configured for the UE.

22. The first node of claim 18, when the first node is the RAN side node of the LTE system and the second node is the RAN side node of the NR system, the processor is further configured to:
determine resource information used by an RRM measurement corresponding to a frequency point configured for the UE from the resource information used by the at least one RRM measurement; and determine a measurement gap according to the resource information used by the RRM measurement corresponding to the frequency point configured for the UE.

23. The first node of claim 14, wherein the first node is a Distributed Unit (DU) node of an NR system, and the second node is a Central Unit (CU) node of the NR system; and the processor is further configured to:

receive the resource information carried in a second message sent by the second node and used by the at least one RRM measurement corresponding to the neighbor node of the second node.

24. The first node of claim 23, the second message is one of:

a second interface setup response message, a UE context setup request message, and a UE context modification request message.

25. The first node of claim 23, the processor is further configured to:

receive a second update message sent by the second node;

wherein the second update message is sent after the second node determines that the resource information used by an RRM measurement corresponding to the neighbor node has changed, and the second update message comprises:

changed resource information used by the RRM measurement corresponding to the neighbor node, or resource information used by all RRM measurements corresponding to the neighbor node; or wherein the second update message is sent after the second node determines that one neighbor node of the second node has changed, and the second update message comprises:

resource information used by an RRM measurement corresponding to a changed neighbor node, or resource information used by RRM measurements corresponding to all neighbor nodes.

26. The first node of claim 23, the processor is further configured to:

determine resource information used by an RRM measurement corresponding to a frequency point configured for the UE from the resource information used by the at least one RRM measurement; and determine a measurement gap according to the resource information used by the RRM measurement corresponding to the frequency point configured for the UE.

27. A non-volatile readable storage medium storing a computer program thereon, wherein when executed by a processor, the computer program implements a method of:

receiving resource information sent by a second node and used by at least one RRM measurement corresponding to a neighbor node of the second node; and determining RRM measurement configuration required for a User Equipment (UE) to perform an RRM measurement according to the resource information used by the at least one RRM measurement.

* * * * *